Oct. 16, 1951  A. MURRAY, III, ET AL  2,571,926
PREPARATION OF ORGANIC MATERIALS
Filed Oct. 18, 1948
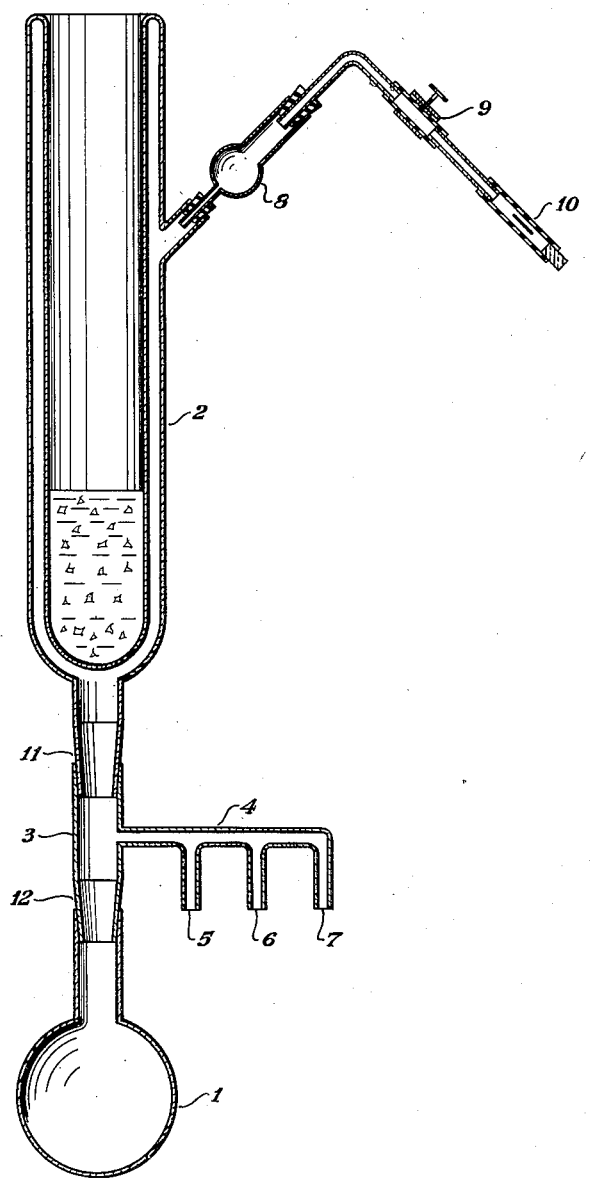
WITNESSES
INVENTORS.
Arthur Murray III
Anthony R. Ronzio
BY

Patented Oct. 16, 1951

2,571,926

UNITED STATES PATENT OFFICE 2,571,926

PREPARATION OF ORGANIC MATERIALS

Arthur Murray, III, and Anthony R. Ronzio, Los Alamos, N. Mex., assignors to the United States of America as represented by the United States Atomic Energy Commission Application October 18, 1948, Serial No. 55,174

1 Claim. (Cl. 23—78)

This invention relates to organic syntheses and more particularly to the synthesis of cyanamide and its hydrolysis product, urea.

The preparation of pharmaceutical materials requires a procedure for obtaining the desired compounds without substantial impurities or materials difficult to separate from the product. Furthermore, with the availability of radioactive isotopes, it is necessary to find procedures for incorporating the isotopes into desired compounds in order to label them. Among some of the compounds which it is desired to label in order to observe the metabolism thereof, are the barbiturates and the basic compound urea. Carbon 14 has now been made available but no satisfactory procedure existed for incorporating the carbon 14 into the urea compound with high yields and pure products.

It is an object of this invention to prepare substantially pure cyanamide, urea and urea derivatives.

It is a further object to prepare labeled cyanamide, urea and urea derivatives in high yields.

Other objects will be apparent from the following description and claim.

In general the process of this invention comprises reacting barium carbonate with barium amide to form barium cyanamide and hydrolyzing the barium cyanamide to form cyanamide and in turn urea. By forming carbon dioxide from carbon 14, and reacting the carbon dioxide with barium oxide or hydroxide, it is possible to prepare barium carbonate containing carbon 14. By the process of this invention, it is feasible to convert such barium carbonate to carbon 14 labeled urea. This compound can in turn be converted to barbiturates, hydantoins, and other compounds containing the urea groups by procedures well known in the art.

Before further disclosing the nature of this invention, attention is directed to the single figure of the drawing hereby made a part of this specification.

To long-necked flask 1 of about 50 milliliter capacity is attached inlet tube 3 by means of 24/40 standard taper joint 12. Inlet tube 3 is integral with manifold 4 which supplies connections for a vacuum line at 5, an ammonia inlet at 6 and a nitrogen inlet at 7. A Dry Ice condenser 2 fits into the upper end of inlet tube 3 through standard taper joint 11. A drying tube 8 attached near upper end of condenser 2 contains potassium hydroxide to prevent entrance of extraneous carbon dioxide. Screw clamp 9 and bunsen valve 10 serve as further precautions to prevent the contamination of the interior of the system by exterior elements.

At joint 11 the system may be broken to admit such materials as are necessary to the process.

The following example is given for the purpose of illustrating the invention, but it is not intended to be limiting on the scope thereof.

Example

One to five millimoles of barium carbonate are placed in a 50 milliliter long-necked, round-bottomed flask 1 which is equipped with a ground glass joint and which has been dried at 120° C. for 16 hours. The flask is connected to a Dry Ice reflux condenser 2 as shown in the figure. The system is then alternately evacuated through 5 and filled through 7 several times with a stream of purified nitrogen in order to remove all traces of carbon dioxide. While maintaining a stream of nitrogen through 7, four to seven grams of freshly cut, shiny barium metal which has been well washed with dry ether is then introduced into the flask 1 at joint 11. A crystal of ferric nitrate catalyst is added and the system is closed. The reflux condenser 2 is filled with Dry Ice chips. From another flask containing liquid ammonia with a small amount of dissolved sodium, ammonia is allowed to distill into flask 1 through inlet 6 until the flask is ⅔ full. The mixture is allowed to react until all of the barium is converted to the amide (as is indicated by the disappearance of the blue color). This conversion can be effected within 24 hours by adding a second crystal of ferric nitrate after 12 hours. When the flask is allowed to stand overnight, it is immersed in a Dewar tube filled with Dry Ice in order to prevent the ammonia from boiling off. At the end of the reaction, the excess ammonia is allowed to distill off. The system is then slanted at an angle of 45 degrees and flask 1, while still connected to the apparatus, is slowly heated with a Fisher burner. The heat is slowly increased until the flask is dull red. The contents of the flask are white, then turn gray, yellow, brown, and finally black. At this point the glass begins to soften and the contents cease to froth and set to a black mass, whereupon the system is allowed to cool. The flask then is shattered into a 400 milliliter beaker and washed out with three 100 milliliter portions of boiling distilled water. The aqueous mixture is filtered. The filtrate is treated with carbon dioxide gas until all of the barium is precipitated as the carbonate. The solution is neutral at this point. The barium carbonate is filtered off and washed with distilled water. The precipitate should be kept until the end of the experiment. The filtrate and washings are treated with 0.6 milliliter of concentrated sulfuric acid in order to hydrolyze the cyanamide formed. The solution is allowed to evaporate slowly at a temperature of 40° C. to a few milliliters of syrupy residue. The syrup is diluted to 25 milliliters with distilled water and filtered in order to remove a small amount of barium sulphate. The filtrate then is made alkaline with ammonium hydroxide and evaporated to dryness at room temperature under a gentle stream of air. The drying is completed in a vacuum desiccator over calcium chloride. As the drying progresses, it is necessary to break the crust over the liquid as often as it forms. The dried residue is then extracted with four 10 milliliter portions of hot propyl alcohol. It is necessary that the precipitate be crushed to a fine powder during the extraction and that the solvent be allowed to cool before filtration. The solvent is removed from the filtrate under vacuum at room temperature. The yield of crude product is about 102 percent, and the material melts from 110-18° to 129-30° C.

The barium carbonate, which is saved, is treated with a slight excess over the calculated amount of warm dilute hydrochloric acid and filtered. The filtrate is then treated with the calculated amount of ammonium sulphate and filtered. The filtrate, already acidic from the hydrochloric acid, is evaporated to dryness at room temperature. The residue is diluted with water, adjusted to a pH 5-6 with dilute potassium hydroxide, made basic with ammonium hydroxide, and evaporated to absolute dryness. The precipitate is extracted with propyl alcohol as before. The final purification is carried out by dissolving the product in methanol, decolorizing with Norite, evaporating to dryness, and finally re-crystalling from isoamyl alcohol.

Solvents other than propyl alcohol may be used in the re-crystallization process. For example, fifty milligrams of urea in one milliliter of isoamyl alcohol gives about 91 percent recovery when the mixture is cooled to minus 30° C. Products obtained from synthesis on the one millimole scale by this procedure melt at 110°-129° C. and after purification at 125°-130° C. On a five millimole scale the products melt at 123°-131° C. and melt at 131°-133° C. after purification.

Acetone may also be used in the purification method. In this case fifty milligrams of urea in 7 milliliters of acetone gives an 85 percent recovery of urea at minus 40° C.

A typical synthesis using 2.53 millimoles of barium carbonate yields 144.8 milligrams of urea which is 95.2 percent of theoretical. The material contains 1.977 millicuries per millimole and melts at 125°-130° C. When the product is recrystallized from acetone as described above, the yield is 123 milligrams of the material which melts at 132°-133° C.

Although many widely different embodiments of the invention may be made without departing from the spirit or scope thereof, it is to be understood that the invention is not to be limited except as indicated in the appended claim.

What is claimed is:

The process of producing barium cyanamide which comprises introducing barium carbonate into a flask, flushing the flask with purified nitrogen gas, adding under the protection of a stream of said nitrogen gas, shiny barium metal and a crystal of ferric nitrate catalyst to the flask, introducing liquid ammonia therein and allowing the conversion of the barium metal to barium amide to take place, evaporating the remaining liquid ammonia, and heating the contents of the flask at a temperature between about 500° C. and 900° C..

ARTHUR MURRAY, III.
ANTHONY R. RONZIO.

REFERENCES CITED

The following references are of record in the file of this patent:

UNITED STATES PATENTS

| Number | Name | Date |
|---|---|---|
| 2,413,469 | Schweitzer | Dec. 31, 1946 |

FOREIGN PATENTS

| Number | Country | Date |
|---|---|---|
| 816 of 1910 | Great Britain | Jan. 12, 1911 |
| 151,596 | Great Britain | Dec. 2, 1921 |

OTHER REFERENCES

Sidgewick, "Organic Chemistry of Nitrogen," 1937, Oxford at the Clarendon Press, page 329.